(12) United States Patent
Knapp

(10) Patent No.: US 6,992,275 B1
(45) Date of Patent: Jan. 31, 2006

(54) NIGHT VISION APPARATUS

(75) Inventor: David J. Knapp, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/927,725

(22) Filed: Aug. 27, 2004

(51) Int. Cl.
*H01J 40/14* (2006.01)
*G02B 3/10* (2006.01)

(52) U.S. Cl. .................. 250/214 VT; 250/207; 359/353; 359/410

(58) Field of Classification Search ......... 250/214 VT, 250/207; 359/353, 410
See application file for complete search history.

(56) References Cited

U.S. PATENT DOCUMENTS

| | | | |
|---|---|---|---|
| 4,000,419 A | 12/1976 | Crost et al. | |
| 4,376,889 A * | 3/1983 | Swift | 250/214 VT |
| 4,463,252 A | 7/1984 | Brennan et al. | |
| 4,653,879 A | 3/1987 | Filipovich | |
| 5,079,416 A | 1/1992 | Filipovich | |
| 5,175,651 A | 12/1992 | Marron et al. | |
| 5,229,598 A | 7/1993 | Filipovich | |
| 5,760,953 A | 6/1998 | Task et al. | |
| 5,770,847 A * | 6/1998 | Olmstead | 235/462.35 |
| 6,088,165 A | 7/2000 | Janeczko et al. | |
| 6,121,601 A | 9/2000 | Afsenius | |

* cited by examiner

*Primary Examiner*—Kevin Pyo
(74) *Attorney, Agent, or Firm*—Renner, Otto, Boisselle & Sklar, LLP

(57) ABSTRACT

A multi-focal night vision apparatus is disclosed. The apparatus can include a receptor for receiving light reflected off of and emitted from objects in an image field of the night vision apparatus and a set of optical elements for focusing the light onto the receptor. The optical elements can include a field lens having a first portion for focusing far field objects and a second portion for simultaneously focusing near field objects.

21 Claims, 5 Drawing Sheets

NIGHT VISION APPARATUS

TECHNICAL FIELD

The present invention relates generally to night vision equipment and, more particularly, to a night vision apparatus that displays multi-focal images to a user.

BACKGROUND

Night vision goggles and similar optics systems have been widely used by military personnel and civilians to enhance viewing during nocturnal activities and in other low illumination conditions. Many night vision devices operate at low light levels by amplifying a received light pattern. As used herein, the term light is broadly defined and includes, but is not limited to, electromagnetic radiation in the visual spectrum, the infrared range and the ultraviolet range. The received light is light that has been reflected off of objects and/or emitted by objects to form an image. After passing though a lens assembly to focus the received light, a photomultiplier tube amplifies the light and a corresponding image is presented to the user with a phosphor screen. In this arrangement, the user's vision is through the night vision device and the user has no direct image of the environment before him or her.

In most situations, and especially in military applications, the user needs to be able to view things at a distance (e.g., enemy combatants, a roadway, etc.) as well as things closely located to the user (e.g., the terrain around the user's feet, hand operated equipment and so forth). Conventional night vision equipment includes a manually operated focus device to adjust the focal point of the focusing optics and/or a mechanism to switch between a near field viewing mode and a far field viewing mode. Using these devices can be tedious and time consuming. Changing the focus can also distract the user's attention away from more pressing matters, such as operating a vehicle or engaging enemy combatants.

When the night vision equipment is focused for far field objects, soldiers have complained that they cannot clearly see obstacles near their feet or equipment that they need to operate. Accordingly, the soldier's mobility is adversely affected by the focus settings of the night vision equipment. Similarly, when the equipment is focused for near field objects, the soldiers cannot clearly see objects at any appreciable range, which also compromises the soldier's ability to carry out an objective.

Attempts have been made to automatically adjust the focus of the night vision equipment, but these systems have used motorized assemblies that add a significant amount of weight to the equipment. The added weight can be burdensome to users of a head mounted night vision system. These systems also include complex electronics to track the user's eye movements and may not be able to refocus the focusing optics fast enough to adequately perform in stressing situations.

Accordingly, there is a need in the art for an improved night vision assembly that allows a user to clearly view near field and far field objects.

SUMMARY OF THE INVENTION

According to one aspect of the invention, a multi-focal night vision apparatus includes a receptor for receiving light reflected off of and emitted from objects in an image field of the night vision apparatus; and a set of optical elements for focusing the light onto the receptor, the optical elements including a field lens having a first portion for focusing far field objects and a second portion for simultaneously focusing near field objects.

According to another aspect of the invention, a multi-focal night vision apparatus includes a receptor for receiving light reflected off or and emitted from objects in an image field of the night vision apparatus; and an optical assembly that focuses light rays from objects in an upper portion of the image field with a first focal length and simultaneously focuses light rays from objects in a lower portion of the image field with a second focal length shorter than the first focal length.

According to yet another aspect of the invention, a field lens for imparting multi-focal capability to a night vision apparatus includes a first portion that focuses light rays from objects in an upper portion of an image field of the night vision apparatus with a first focal length; and a second portion that simultaneously focuses light rays from objects in a lower portion of the image field with a second focal length shorter than the first focal length.

BRIEF DESCRIPTION OF DRAWINGS

These and further features of the present invention will be apparent with reference to the following description and drawings, wherein.

DESCRIPTION

Figure 1:
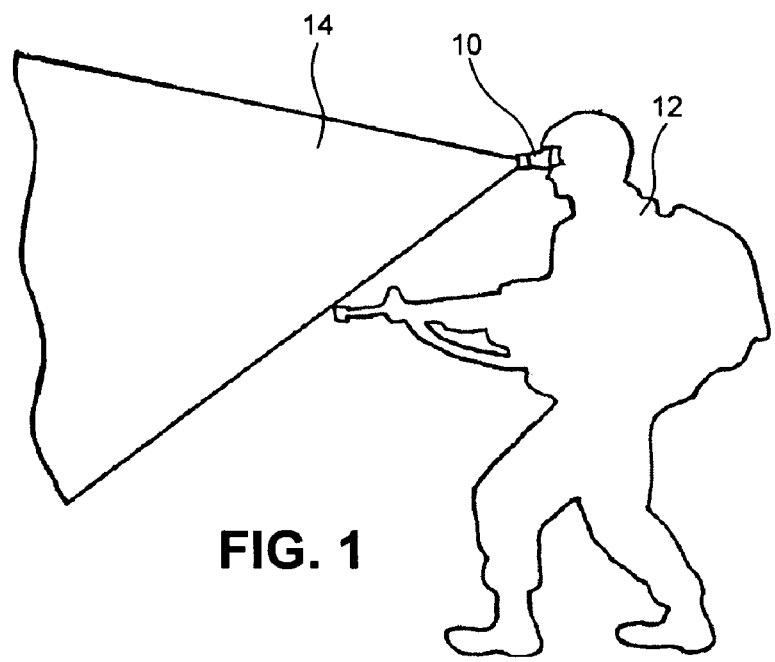
FIG. 1 is a schematic view of a night vision apparatus according to the present invention in use by a soldier.

In the description that follows, like components have been given the same reference numerals, regardless of whether they are shown in different embodiments of the present invention. To illustrate the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Aspects of the present invention are directed to a night vision assembly that includes focusing optics that place near field objects and far field object in focus to a user of the night vision assembly at the same time. To achieve such focusing capability, the night vision apparatus can include a field lens having portions that separately focus near field images and far field images onto an image plane, such as the surface of a light receptor device (e.g., a photomultiplier tube). For example, the field lens can have a multiple portions, each of which focus a corresponding portion of a light pattern receive by the night vision assembly. In a bifocal embodiment (e.g., two foci) the field lens can include a first portion for distance viewing that focuses an upper portion of an image field and a second portion for near viewing that focuses a lower portion of the image field. In such an embodiment, the first portion can be focused at a hyperfocal distance and the second portion can be focused at about two meters, such as for viewing terrain near a user's feet. Trifocal and higher order focal embodiments, as well as progressive focal embodiments, are also contemplated.

With reference to the accompanying drawings, FIG. 1 shows a night vision apparatus 10 in use by a user 12 to facilitate viewing in low illumination conditions, such as at night. In the illustrated embodiment, the user 12 is a soldier on foot. It will be appreciated that the night vision apparatus 10 can be used by other types of military personnel and civilians. Also, the user 12 need not be on foot and the night vision apparatus 10 can be used while engaged in a wide variety of activities, such as driving a vehicle, piloting an aircraft, surveying a battleground and repairing downed power line, to name a few example activities.

In the illustrated example, the night vision apparatus 10 presents an image representing objects in an image field 14 to the user 12. The size of the image field 14, which is typically measured in degrees, will depend on the particular arrangement of the night vision apparatus 10. Light that is reflected off of and/or emitted by objects in the image field 14 can be received by the night vision apparatus 10, electronically detected, amplified, processed, presented and/or displayed to the user 12. In other uses, the night vision apparatus 10 can be used to generate an image for indirect display to the user 12, such as on a computer screen, a remote control console for a piece of equipment and so forth. In still other uses, an output of the night vision apparatus 10 can be used directly by a piece of equipment, such as by a recording device to preserve the image on a recordable medium (e.g., a video camera), by a robot, by a computer controlled vehicle and so forth.

Figure 2:
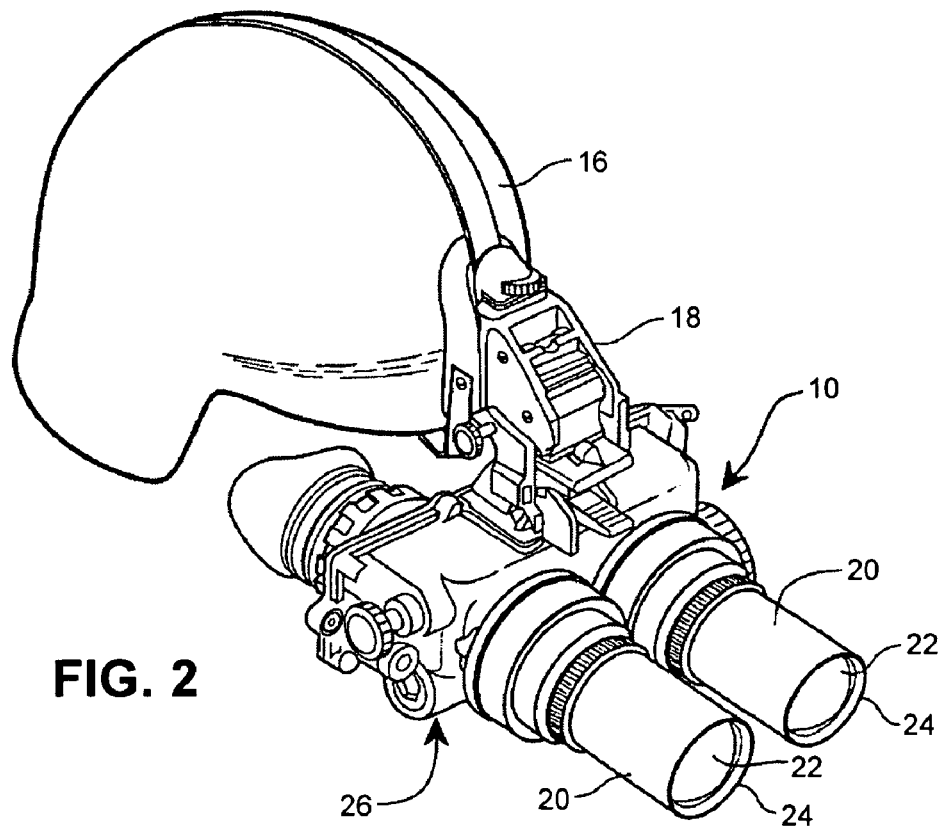
FIG. 2 is a perspective view of the night vision apparatus embodied as helmet mounted vision goggles.

With additional reference to FIG. 2, shown is a perspective view of the night vision apparatus 10. In the illustrated example, the night vision apparatus 10 is embodied as helmet 16 mounted vision goggles. The night vision apparatus 10 can be connected to the helmet 16 with a pivotal mounting assembly 18. In other embodiments, the night vision apparatus 10 can be mounted directly to the head of the user 12 (e.g., with a strap, glasses frame, etc.) as goggles, head-mounted display (HMD), glasses, spectacles and the like; mounted to a respirator or gas mask; held by a support member (e.g., pole or tripod); or any other way of positioning the night vision apparatus 10 to "view" a desired image field 14 and output a corresponding signal or image of the image field 14.

The illustrated night vision apparatus 10 has a binocular arrangement having optics and vision enhancing components for both eyes of the user 12. In other embodiments, the night vision apparatus 10 can be monocular or a combination thereof (e.g., monocular optics, but an eyepiece for both eyes).

The night vision apparatus 10 can include one or more oculars 20, each with an objective lens 22 located adjacent a distal end 24 of the oculars 20. The oculars 20 are connected to a housing 26 that contains additional components of the night vision apparatus 10.

Figure 3:
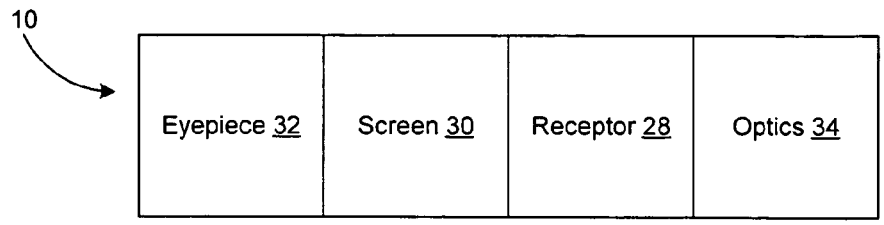
FIG. 3 is a schematic block diagram of the night vision apparatus.

With additional reference to FIG. 3, contained within the housing 26 can be components for each ocular 20. These components can include a receptor 28 onto which light is focused as described in greater detail below. In one night vision apparatus embodiment, the receptor 28 is a photomultiplier tube or other image/light intensifier, which amplifies the light incident on the receptor 28. The components also can include a screen 30, such as a phosphor screen that displays an intensified representation of the image field 14. The components also can include an eyepiece 32 through which the user views the screen 30. The eyepiece 32 can include optical elements (e.g., lenses) to focus the image of the screen 30 onto the user's eye. In this arrangement, the user's eye can be considered a detector. In yet another example, the representation of the image field can be captured using a detector other than or in addition to the user's eye, such as with film or a charged-coupled device (CCD) camera. These components, as well as another components, adjustment devices, power supplies and so forth that form a part of the night vision apparatus 10, can be implemented with any suitable components as will be known to one of ordinary skill in the art.

As will be appreciated, alternative arrangements to the example illustrated in FIG. 3 are possible and are considered to fall within the scope of the invention as defined by the claims appended hereto. For example, the receptor 28 could be a type of detector, such as a CCD camera with associated electronics for processing an output of the camera, and/or the screen could be implemented with a display, such as a CRT, LCD or plasma display. As another example, the receptor simply can be an intermediate image plane for any number of applications, such as a telescope having a reticle placed at the intermediate image plane and additional optical elements placed between the reticle and a detector (e.g., a user's eye or a camera). More complex arrangements might have multiple intermediate image planes before the light becomes incident on a target surface or final image plane.

As will be appreciated, the term receptor as used herein is broadly defined to include any surface, device, element, component or plane (intermediate or otherwise and/or associated or unassociated with a physical object) upon which a multifocal image is incident. Accordingly, the receptor 28 can include, without limitation, a detector device (e.g., film, a CCD camera, etc.), a "passive" optical element (e.g., a lens), an "active" optical element (e.g., a photomultiplier tube or other image intensifier), a reticle, and so forth. As will be described below, aspects of the invention include a field lens 36 that can form part of a set of optics 34. The field lens 36 achieves the multifocal characteristic of the image incident on the receptor 28. The field lens 36, in most embodiments, is disposed on or near (e.g., adjacent) the receptor 28. Although the field lens 36 is illustrated as not having any objects between the receptor 28 and the field lens 36, some arrangements may include objects therebetween.

Although the night vision apparatus 10 can include two sets of components (e.g., the optics 34, the receptor 28, the screen 30 and the eyepiece 32) that separately establish a "visual pathway" for each eye of the user 12, the following description will be directed to a single set of components for purposes of a concise description. It will be appreciated that the described components and their interaction can be replicated for a second "visual pathway."

Figure 4:
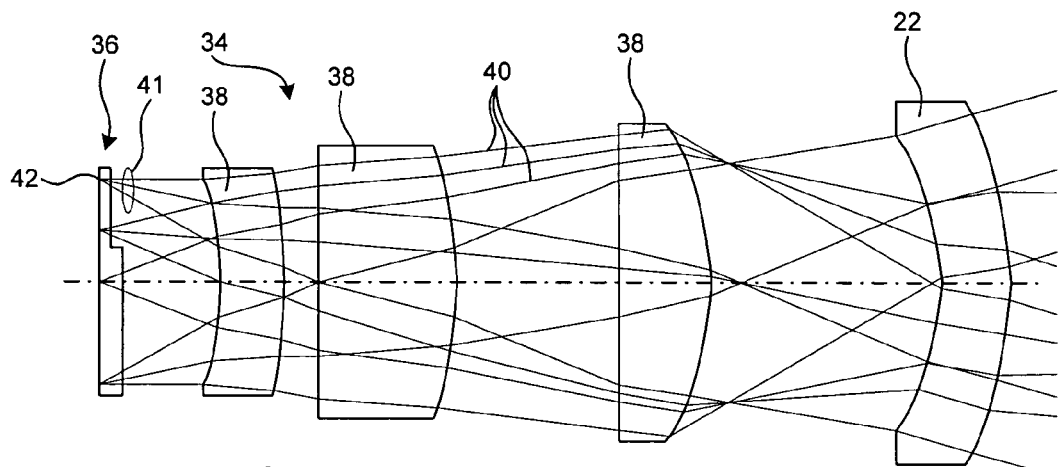
FIG. 4 is a side view of an optics assembly of the night vision apparatus.
Figure 5:
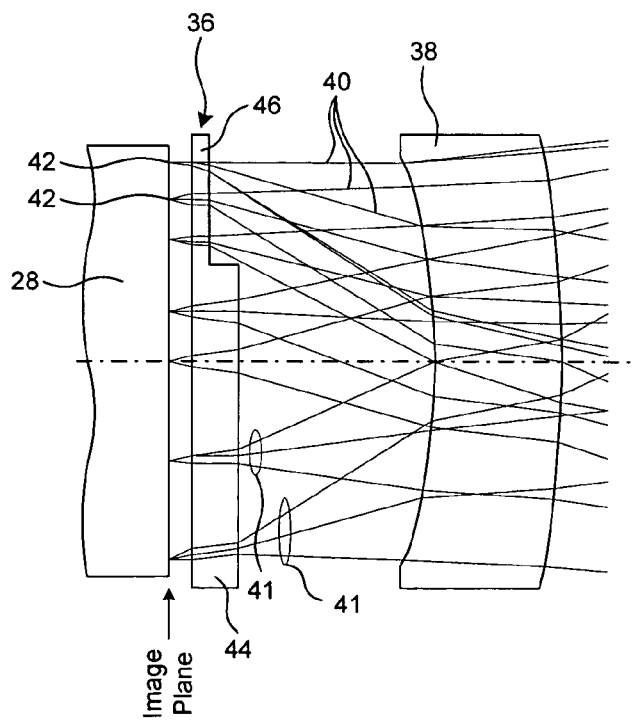
FIG. 5 is an enlarged side view of an example embodiment of a field lens for the night vision apparatus.

With additional reference to FIGS. 4 and 5, light that is reflected off of and/or emitted from objects within the image field 14 of each ocular 20 will be focused onto an image plane using a set of optical elements 34. The optical elements 34 can include the objective lens 22 and a field lens 36 with appropriate intermediate lens 38 disposed between the objective lens 22 and the field lens 36. The field lens 36 can be located at the proximal end of the ocular 20 such that the field lens is on or adjacent the receptor 28. The surface of the receptor 28, or light sensitive elements thereof, can be located coincident with the image plane. In this manner, the light received by the ocular 20 that has been reflected off of objects and/or emitted by objects in the image field 14 will be focused onto the receptor 28 as an image. In the illustrated night vision assembly 10, the receptor 28 amplifies the image incident on the receptor 28 and the screen 32 displays a corresponding image to the user 12. Light focused onto the image plane is depicted as rays of light 40. Groups of rays 40, or bundles 41, are focused into spots 42.

In the example optical arrangement, the image field 14 is projected "up side down" onto the receptor 28. For example, light rays 40 from objects in a lower portion of the image field 14 are generally focused on an upper portion of the receptor 28 and light from objects in an upper portion of the image field 14 is generally focused on a lower portion of the receptor 28. the image that is incident on the receptor 28 is inverted again (e.g., by the eyepiece 32) so that the image presented to the user 12 appears as a "right side up" representation of the image field 14.

The field lens 36 is formed to impart a multi-focal effect to the image focused onto the receptor 28. In the illustrated example, the field lens 36 is a plane parallel plate having a stepped thickness. A lower portion 44 of the field lens 36 has a first thickness and an upper portion 46 of the field lens has a second thickness that is thinner than the first thickness. The two thicknesses correspond to two different foci. The focus of the lower portion 44 is selected for far field object viewing (e.g., distance viewing) and the focus of the upper portion 46 is selected for near field object viewing. Since the image of the image field 14 at the field lens 36 is inverted, the focus of the upper portion of the image field 14 is a function of the properties of the lower portion 44 and the focus of the lower portion of the image field 14 is a function of the properties of the upper portion 46. It is possible that the optical elements 34 of the ocular 20 can be arranged such that the image of the image field 14 at the field lens 36 is right-side-up. In this case, the field lens 36 can be inverted relative to the illustrated arrangement and the electronics 30 will not be used to invert the detected image.

Figure 6:
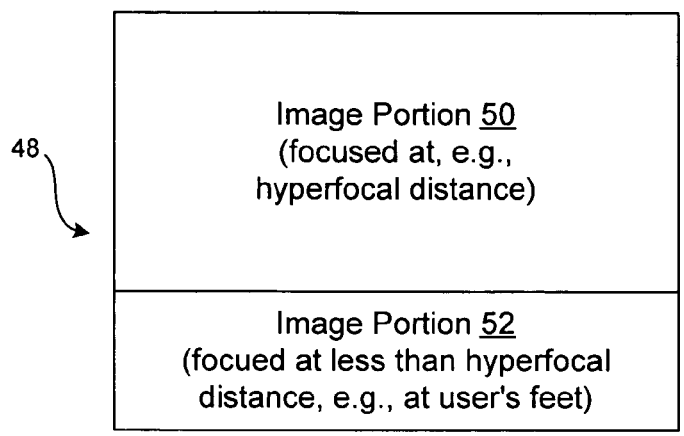
FIG. 6 is schematic view of an image presented to a user of the night vision apparatus.

With additional reference to FIG. 6, shown is a schematic view of an image 48 displayed to the user 12 of the night vision apparatus 10. The image 48 corresponds to the image focused onto the receptor 28 with the optics 34, including the field lens 36. In the illustrated example where the image incident on the receptor 28 is inverted with respect to the image field 14, an upper portion 50 of the image 48 is focused in correspondence with the focus imparted by the lower portion 44 of the field lens 36 and a lower portion 52 of the image 48 is focused in correspondence with the focus imparted by the upper portion 46 of the field lens 36.

In one embodiment, the focus imparted by the lower portion 44 of the field lens 36 is at the hyperfocal distance of the optics 34. The hyperfocal distance is the nearest distance at which the optics 34 can be focused and still produce a clear image at infinity. When focused at the hyperfocal distance, the depth of field extends from half the hyperfocal distance to infinity. Since depth of field for the illustrated night vision apparatus 10 is the range of distances that an object may be in focus such that optical blur from a point on the object does not exceed the size of an individual light sensitive component of the receptor 28, objects in the upper portion 50 of the image 48 that are spaced from the night vision apparatus 10 in the range of half the hyperfocal distance to infinity will be clear. In one embodiment, the image received through the lower portion 44 can have a depth of focus of about twenty meters to infinity. The size of the individual light sensitive components of the receptor 28 can vary depending on the specific receptor 28.

A lower portion 52 of the image 48 is focused in correspondence with the focus imparted by the upper portion 46 of the field lens 36. In the illustrated example, the focus imparted by the upper portion 46 of the field lens 36 is at a distance less than the hyperfocal distance of the optics 34, such as about one to five meters. A focal distance of about one to five meters has been found to be a suitable focal distance for viewing objects near the user's feet. In this arrangement, the night vision apparatus 10 can simultaneously be focused for close objects in the lower portion 52 of the image 48 and for far objects in the upper portion 50 of the image 48.

The vertical size of the upper portion 50 relative to the vertical size of the lower portion 52 can have a direct relationship to the size of the lower portion 44 relative to the size of the upper portion 46. In one embodiment, the vertical size of the upper portion 50 can account for about sixty percent to about eighty percent of the overall image 48. As an example, if the lower portion 44 focuses light corresponding to seventy-five percent of a field of view (e.g., from about minus twenty degrees to about plus ten degrees of a forty degree field of view) and the upper portion focuses the light corresponding to the other twenty-five percent of the field of view (e.g., from about plus ten degrees to about twenty degrees of the forty degree field of view), then the upper portion 50 can be about seventy-five percent of the image 48 and the lower portion can be about twenty-five percent of the image 48.

Movement of the user's eyes with respect to the screen 32 and movement of the night vision apparatus 10 (e.g., by movement of the user's head) to change the image field 14 can allow the user to quickly perceive objects surrounding the user 12 located at various distances. Such eye and apparatus 10 movements are similar to the way a person having bifocal glasses would use those glasses for near and far field viewing.

To illustrate the effectiveness of the arrangement of the field lens 36, an example using a night vision assembly that has a field of view of about forty degrees and where the size of the individual light sensitive components of the receptor 28 is about 20 microns will be described. In a conventional arrangement where the field lens 36 for the example night vision assembly is a plane parallel plate focused at the hyperfocal distance, light ray 40 bundles 41 corresponding to an object at a distance of about two meters will have a spot 42 size of about 400 microns. Light ray 40 bundles 41 corresponding to an object at a distance of about twenty meters to infinity will have a spot size of less than twenty microns. As is apparent, the spot size of the near field object is larger than the light sensitive components of the receptor 28 and will be out of focus, and appear, at best, blurry to the user 12.

Figure 7A:
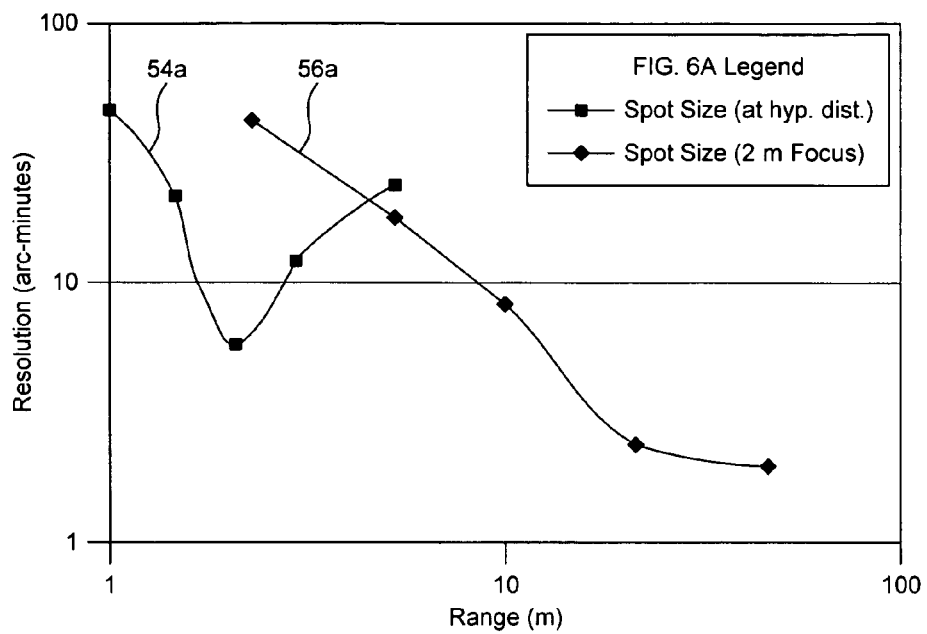
FIG. 7A is a graph of spot size versus range for the night vision apparatus with the axes having logarithmic scales.
Figure 7B:
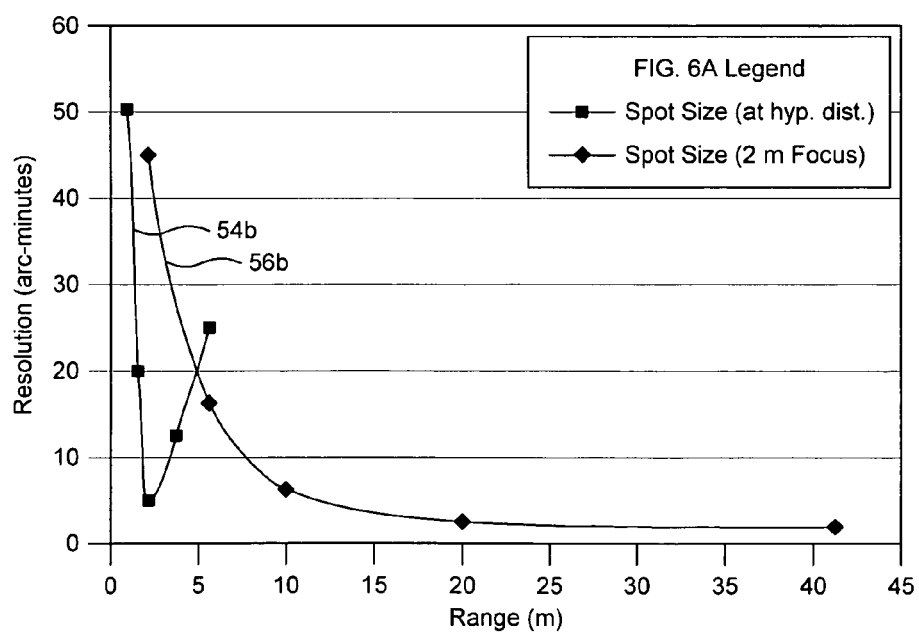
FIG. 7B is a graph of spot size versus range for the night vision apparatus with the axes having linear scales.

With additional reference to FIGS. 7A and 7B, the spot size versus range is plotted for the same example night vision apparatus (i.e., the example apparatus having a field of view of about forty degrees and individual light sensitive components that are about 20 microns), but where the field lens 36 having a stepped thickness is used. The thickness of the upper portion 46 corresponds to the field of view from about plus twenty degrees (+20 deg.) to about plus ten degrees (+10 deg.) and is focused at about two meters. The thickness of the lower portion 44 corresponds to the field of view from about +10 deg. to about minus twenty degrees (−20 deg.) and is focused at about the hyperfocal distance. The plots of FIGS. 7A and 7B are the same, except that the axes of FIG. 7A have logarithmic scales and the axes of FIG. 7B have linear scales. As shown in the graphs, a first curve 54 (54*a* in FIG. 7A and 54*b* in FIG. 7B) shows resolution of light bundles 41 focused through the upper portion 46. An object located less than about five meters from the night vision assembly 10, and particularly at about two meters, will have an acceptable resolution. For example, an object at two meters will have a spot size of about forty-five microns for an object at two meters. A second curve 56 (56*a* in FIG. 7A and 56*b* in FIG. 7B) shows resolution of light bundles 41 focused through the lower portion 44. An object located more than about ten meters from the night vision assembly 10, and particularly more than about twenty meters, will have an acceptable resolution. For example, an object at about twenty meters to infinity will have a spot size of less than about twenty microns. From this example, it will be apparent that the user's feet will be in better focus than compared to the conventional night vision assembly and far field objects will be clearly visible.

These results can be seen in the illustration of FIG. 5 where light bundles 41 imaged through the lower portion 44 of the field lens 36 and corresponding to far field objects are focused onto the receptor 28. Similarly, light bundles 41 imaged through the upper portion 44 of the field lens 36 and corresponding to near field objects are also focused on the receptor 28. As indicated, the image incident on the receptor 28 in the illustrated example is inverted relative to the actual image field 14 and the image presented to the user 12 (see, for example, the representative image of FIG. 6).

As indicated, the field lens illustrated in FIGS. 4 and 5 is a plane parallel plate having a stepped thickness. The plate can be made by taking a plane parallel plate having a thickness and index of refraction that is desired for the lower portion 44. This plate can be locally ground, etched and/or otherwise thinned to form the upper portion 46. As will be appreciated, alternatives to this embodiment are possible. Several alternatives are listed and/or described herein, but these examples are not intended to be a complete list of alternatives. Features of one alternative can be combined with or substituted for features of another alternative. For each of the various alternatives and embodiments, a layer(s) and/or coating(s) can be added to either or both of the portions 44, 46; either or both of the portions 44, 46 can be imparted with a curved surface or surfaces; and/or either or both of the portions can be modified such that the index of refraction is the same or different for the portions 44, 46. Also, the portions 44, 46 can be made from one piece of material in unitary fashion, made from multiple pieces of material that are secured together (e.g., by fusing, adhesive, mechanical device, etc.) or made from multiple pieces of material that are not secured together but retained in a relative relationship where the pieces contact each other or are spaced apart from one another. The index of refraction of the portions 44, 46 can be the same or different. The material(s) used to make each of the portions 44, 46 can be the same or different. Also, the techniques used to establish a bifocal effect using portions 44, 46 with different properties (e.g., thickness, index of refraction, etc.) can be used to establish a trifocal effect or higher effect by the inclusion of additional portions.

Figure 8:
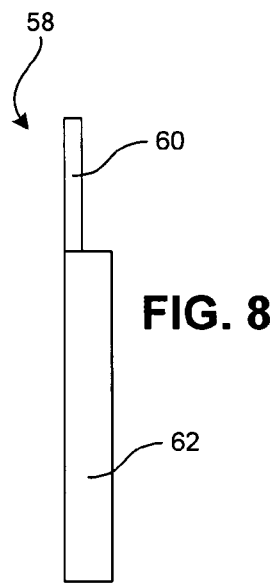
FIG. 8 is a side view of another example embodiment of a field lens for the night vision apparatus.

Referring to FIG. 8, shown is an alternative field lens 58 for use in the night vision apparatus 10. The field lens 58 has an upper portion 60 made from a first plane parallel plate that has a thickness for focusing near field objects located in a lower portion of the image field 14. The field lens 58 has a lower portion 62 made from a second plane parallel plate that is separate from the first plane parallel plate. The second plane parallel plate has a thickness for focusing far field objects located in an upper portion of the image field 14. For example, the upper portion 60 can be focused at less than the hyperfocal distance and the lower portion 62 can be focused at the hyperfocal distance. The first and second plane parallel plates can be secured together or held adjacent one another.

Figure 9:
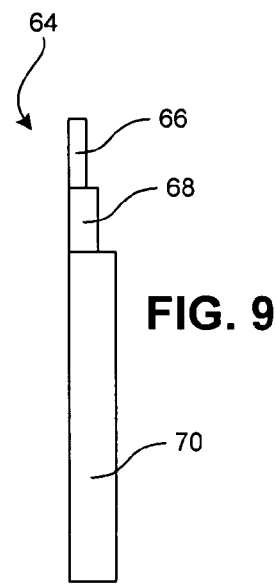
FIG. 9 is a side view of yet another example embodiment of a field lens for the night vision apparatus.

Referring to FIG. 9, shown is another alternative field lens 64 for use in the night vision apparatus 10. The field lens 64 has an upper portion 66 that has a thickness for focusing near field objects located in a lower portion of the image field 14, an intermediate portion 68 having a thickness for focusing objects located at an intermediate distance (e.g., about five meters to about twenty meters), and a lower portion 70 having a thickness for focusing far field objects located in an upper portion of the image field 14. This example field lens 64 provides a trifocal effect to the image presented to the user 12. Each of the portions 66, 68, 70 can be made from separate plane parallel plates or from a single plane parallel plate that has been locally thinned to form the upper portion 66 and intermediate portion 68. As will be appreciated, additional intermediate portions can be added to increase the number of foci of the field lens 64 and/or provide a graduated change in focus from the focus of the lower portion 70 to the upper end of the field lens 64.

Figure 10:
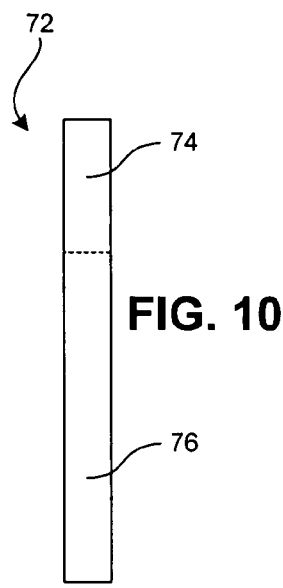
FIG. 10 is a side view of still another example embodiment of a field lens for the night vision apparatus.

Referring now to FIG. 10, shown is another alternative field lens 72 for use in the night vision apparatus 10. The field lens 72 has an upper portion 74 that has an index of refraction for focusing near field objects located in a lower portion of the image field 14 and a lower portion 76 having an index of refraction for focusing far field objects located in an upper portion of the image field 14. This example field lens 74 provides a bifocal effect to the image presented to the user 12. Each of the portions 74, 76 can be made from separate optical elements. Alternatively, the portions 74, 76 can be made from a single optical element that has been locally modified to alter the index of refraction of one of the portions 74, 76. For example, during manufacture of the optical element, a layer can be added to one of the portions 74, 76 of the element. As will be appreciated, an intermediate portion(s) having another index of refraction can be added to increase the number of foci of the field lens 72.

Figure 11:
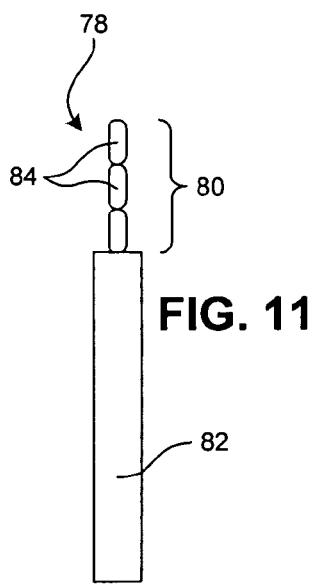
FIG. 11 is a side view of another example embodiment of a field lens for the night vision apparatus.

Referring now to FIG. 11, shown is yet another alternative field lens 78 for use in the night vision apparatus 10. The field lens 78 has an upper portion 80 for focusing near field objects located in a lower portion of the image field 14 and a lower portion 82 for focusing far field objects located in an upper portion of the image field 14. The upper portion 80 is made from a plurality of micro-lenses 84. The micro-lenses 84 can be formed to impart a single focus to the upper portion 80 or can have plural arrangements to provide multiple foci to the upper portion 80. In the illustrated embodiment, the lower portion 82 is a plane parallel plate, but could alternatively be implemented with micro-lenses.

Figure 12:
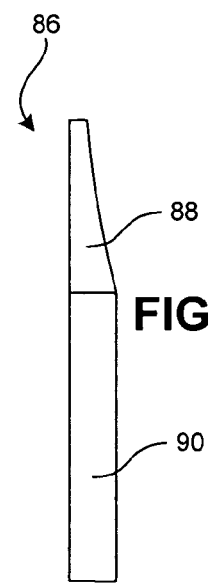
FIG. 12 is a side view of one more example embodiment of a field lens for the night vision apparatus.

Referring now to FIG. 12, shown is still another alternative field lens 86 for use in the night vision apparatus 10. The field lens 86 has an upper portion 88 with features to impart a progressive focus to objects located in a lower portion of the image field 14 and a lower portion 90 having a focus for far field objects located in an upper portion of the image field 14. The progressive focus of the upper portion 88 can be imparted by tapering the thickness of the field lens 86. The taper can be linear or curved. In addition, or as an alternative, the index of refraction of the upper portion 88 can progressively change. In the illustrated embodiment, the lower portion 90 is a plane parallel plate. In one embodiment, the field lens 86 is made by locally and progressively thinning a plane parallel plate that has a thickness desirable for the lower portion 90. Instead of having discrete foci in the upper portion 88, the field lens 86 has a smoothly changing focus from the focus of the lower portion 90 (e.g., focused at the hyperfocal distance) to a desired focus at the upper end of the field lens 86 (e.g., a focus of less than five meters). This progressive change in focus will correspond to the change in shape and/or other property along the longitudinal axis of the field lens 86.

Figure 13:
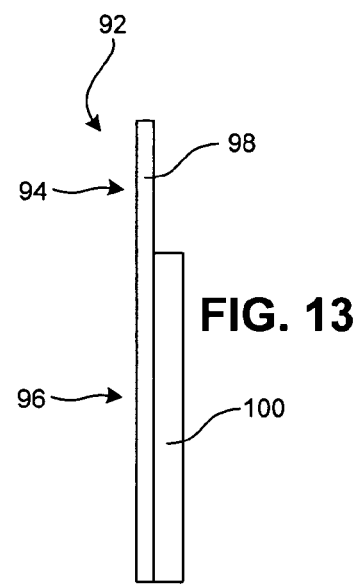
FIG. 13 is a side view of an additional example embodiment of a field lens in the night vision apparatus.

Referring now to FIG. 13, shown is yet another alternative field lens 92 for use in the night vision apparatus 10. The field lens 92 has an upper portion 94 for focusing near field objects located in a lower portion of the image field 14 and a lower portion 96 for focusing far field objects located in an upper portion of the image field 14. The upper portion 94 is made from one or more layers 98 of material. The lower portion is made from the layer(s) 98 and at least one additional layer 100 placed in front of or behind the layer(s) 98 such that the optical characteristics of the layers 98, 100 combine to provide the desired focus of the lower portion 96. In the illustrated example, the layer(s) 98, 100 are plane parallel plates and the layer(s) 100 is shorter than the layer(s) 98. This example field lens 92 provides a bifocal effect to the image presented to the user 12. As will be appreciated, an intermediate length layer or layers can be added to increase the number of foci of the field lens 92.

Various optical elements to generate a multi-focal image for display to a user of the night vision assembly 10 has been described. Other components and/or techniques for generating a multi-focal image are intended to fall within the scope of the invention as defined by the claims appended hereto. These components and/or techniques can include, without limitation, the use of birefringent materials, polarizers, liquid crystal shutters, plates, lenses, prisms, optical waveguides, and combinations of these devices.

Figure 14:
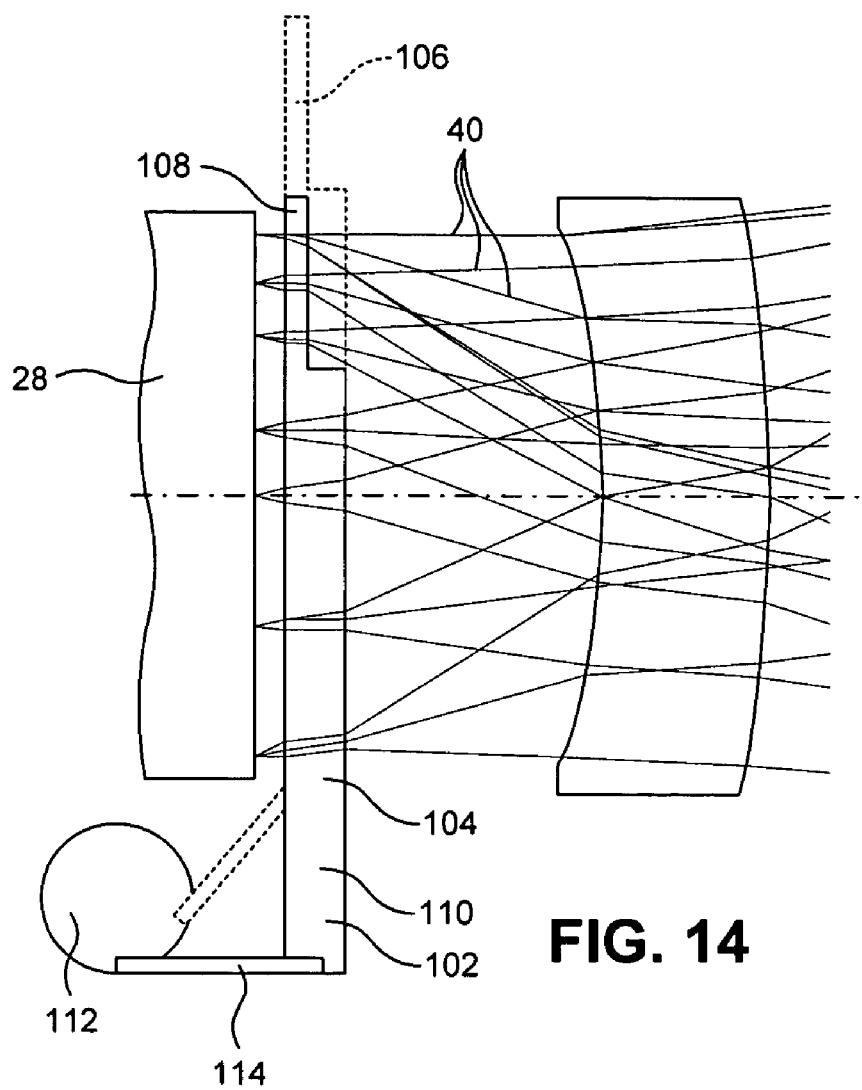
FIG. 14 is a side view of an example mechanized embodiment of a field lens for the night vision apparatus.

Turning now to FIG. 14, shown is a field lens 102 that can be moved between a first position 104 (shown in solid lines) and a second position 106 (shown in dotted lines). In the first position 104, the field lens 102 functions as the bifocal filed lens 36 illustrated in FIGS. 4 and 5. In the second position 106, the field lens 102 has a single focus across the image field 14, such as a focus at the hyperfocal distance. To accomplish the bifocal function of the field lens 102, the field lens 102 can have an upper portion 108 having a focus for near field objects and a lower portion 110 for far field objects. In the first position 104, the field lens 102 can be placed relative to the receptor 28 to focus light rays 40 from a lower portion of the image field 14 through the upper portion 108 and light rays 40 from an upper portion of the image field 14 through the lower portion 110, thereby creating a bifocal image. In the second position 106, the field lens 102 can be placed relative to the receptor 28 to focus light rays 40 from the entire image field 14 through the lower portion 110 such that only far field objects are in focus. In other embodiments, additional positions can be added so that the relative size of the image portion 50 (FIG. 6) that is focused for far field objects and the image portion 2 (FIG. 6) that is focused for near field objects can be adjusted as desired.

In the illustrated embodiment, the field lens 102 is a plane parallel plate having a stepped thickness similar to the field lens 36 illustrated in FIGS. 4 and 5. However, any other type of field lenses to impart a multi-focal image incident on the receptor 28 can be used, such as, for example, the lenses of FIGS. 8–13.

The field lens 102 can be actuated between the positions 104, 106 by a motor 112 that is connected to the field lens 102 by a suitable linkage 114. The user 12 can press a button (not shown) located on the housing 26 (FIG. 2) to activate the motor 112 and reposition the field lens 102. In another embodiment, the field lens 102 can be repositioned by direct manual manipulation by the user 12.

As will be apparent, the arrangement of FIG. 14 allows the night vision apparatus 10 to selectively display one of a mono-focal image or a multi-focal image to the user 12. Other arrangements to accomplish this result are contemplated and are intended to fall within the scope of the claims as appended hereto. For example, the night vision apparatus 10 can have a mono-focal field lens (e.g., a uniform thickness plane parallel plate) and, when the user desired a multi-focal image, an additional optical element(s) can be partially placed in front of or behind the mono-focal field lens to change the focus of part of the image field 14. As another example, the night vision apparatus 10 can generate a mono-focal image with a multi-segment field lens and, when the user desires a multi-focal image, one or more of the segments can be removed from the path of at least some of the light rays 40 so that the remaining field lens segment(s) acts in a multi-focal manner.

Although particular embodiments of the invention have been described in detail, it is understood that the invention is not limited correspondingly in scope, but includes all changes, modifications and equivalents coming within the spirit and terms of the claims appended hereto. For example, the night vision apparatus 10 can be constructed to include multi-focal image capability during an initial manufacturing process or an existing night vision apparatus can be retrofitted to include multi-focal image capability.

As another example, the multi-focal image capability described herein can be applied to other types of optical equipment, including without limitation, telescopes, conventional binoculars for improving distance vision, still photography cameras, video cameras and the like.

What is claimed is:

1. A multi-focal night vision apparatus, comprising:
 a receptor for receiving light reflected off of or emitted from objects in an image field of the night vision apparatus; and
 a set of optical elements defining an optical pathway and for focusing the light onto the receptor, the optical elements including a field lens assembly having a first field lens portion for focusing received light traversing a first portion of the optical pathway and corresponding to far field objects and a second field lens portion for simultaneously focusing received light traversing a second portion of the optical pathway and corresponding to near field objects, the first and second portions of the optical pathway being spatially separate in a plane transverse to an optical axis of the set of optical elements at the field lens assembly.

2. The multi-focal night vision apparatus according to claim 1, wherein the light received by the receptor is amplified and an output image corresponding to the image field has a first portion focused as a function of the first portion of the field lens and a second portion focused as a function of the second portion of the field lens.

3. The multi-focal night vision apparatus according to claim 2, wherein the first portion of the image corresponds to an upper portion of the image field and the second portion of the image corresponds to a lower portion of the image field.

4. The multi-focal night vision apparatus according to claim 1, wherein a first portion of an image of the image field at the receptor that is focused with the first portion of the field lens has a focus of greater than ten meters and a second portion of the image of the image field at the receptor that is focused with the second portion of the field lens has a focus of less than five meters.

5. The multi-focal night vision apparatus according to claim 1, wherein a first portion of an image of the image field at the receptor that is focused with the first portion of the field lens has a focal length of about a hyperfocal distance of the optical elements and a second portion of the image of the image field at the receptor that is focused with the second portion of the field lens has a focal length of less than five meters.

6. The multi-focal night vision apparatus according to claim 1, wherein the field lens is a stepped parallel plate such that the first portion has a thickness different than the second portion.

7. The multi-focal night vision apparatus according to claim 1, wherein the field lens has at least one additional portion for focusing objects at a distance between the focusing capabilities of the first and second portions.

8. The multi-focal night vision apparatus according to claim 1, wherein the second portion of the field lens includes a plurality of micro-lenses.

9. The multi-focal night vision apparatus according to claim 1, wherein the second portion of the field lens imparts a progressive change in focus to a portion of an image corresponding to the image field.

10. The multi-focal night vision apparatus according to claim 1, wherein the first portion of the field lens has an index of refraction that differs from an index of refraction of the second portion of the field lens.

11. The multi-focal night vision apparatus according to claim 1, wherein the field lens includes multiple optical segments, each segment being non-integral with the other segments.

12. The multi-focal night vision apparatus according to claim 1, wherein the field lens assembly includes at least one segment that is moveable relative to the receptor by sliding in and out of the optical pathway to switch the night vision apparatus between a mono-focal mode of the night vision apparatus and a multi-focal mode of the night vision apparatus.

13. The multi-focal night vision apparatus according to claim 1, wherein the field lens provides multiple focal lengths to the optical elements at the same time.

14. The multi-focal night vision apparatus according to claim 1, wherein the field lens is positioned such than near field objects in a lower portion of the image field and far field objects in an upper portion of the image field are simultaneously in focus in an image of the image field at the receptor.

15. The multi-focal night vision apparatus according to claim 1, wherein the field lens assembly has been inserted into the set of optical elements to retrofit a mono-focal night vision apparatus.

16. The multi-focal night vision apparatus according to claim 1, wherein the set of optical elements includes an objective lens and the field lens assembly is disposed between the receptor and the objective lens.

17. The multi-focal night vision apparatus according to claim 16, wherein the set of optical elements includes at least one intermediate lens between the objective lens and the field lens assembly.

18. The multi-focal night vision apparatus according to claim 1, wherein the field lens assembly is disposed immediately in front of the receptor to resolve light bundles traversing the optical pathway to a spot size of less than forty-five microns.

19. The multi-focal night vision apparatus according to claim 1, wherein the first field lens portion focuses objects in about sixty to about eighty percent of the image field.

20. The mufti-focal night vision apparatus according to claim 19, wherein the first field lens portion focuses objects in about seventy-five percent of the image field and the second field lens portion focuses object in about twenty-five percent of the image field.

21. The multi-focal night vision apparatus according to claim 1, wherein the light focused by the first and second field lens portions have overlapping wavelengths.

* * * * *